US009293924B2

(12) United States Patent
Kung et al.

(10) Patent No.: US 9,293,924 B2
(45) Date of Patent: Mar. 22, 2016

(54) ELECTRICAL PHASE SYNCHRONIZATION

(75) Inventors: Kenneth C. Kung, Cerritos, CA (US); Thomas J. Flynn, Allen, TX (US)

(73) Assignee: RAYTHEON COMPANY, Waltham, MA (US)

(*) Notice: Subject to any disclaimer, the term of this patent is extended or adjusted under 35 U.S.C. 154(b) by 1096 days.

(21) Appl. No.: 13/027,817

(22) Filed: Feb. 15, 2011

(65) Prior Publication Data

US 2012/0205987 A1 Aug. 16, 2012

(51) Int. Cl.
*H02J 3/40* (2006.01)
*G05D 19/00* (2006.01)

(52) U.S. Cl.
CPC ............... *H02J 3/40* (2013.01); *Y10T 307/735* (2015.04)

(58) Field of Classification Search
CPC ........... Y10T 307/735; H02J 3/40; H02J 3/44
USPC ...................... 700/286, 295, 293, 296; 307/87
See application file for complete search history.

(56) References Cited

U.S. PATENT DOCUMENTS

| 6,671,291 | B1 | 12/2003 | Soliman |
| 6,915,186 | B2 | 7/2005 | Patterson, Jr. |
| 7,197,378 | B2 | 3/2007 | Sato et al. |
| 7,289,541 | B2* | 10/2007 | Elam ............................ 370/508 |
| 2001/0048290 | A1* | 12/2001 | Underwood et al. ............ 322/20 |
| 2002/0080636 | A1* | 6/2002 | Delbridge ...................... 363/131 |
| 2002/0082748 | A1 | 6/2002 | Enga et al. |
| 2003/0122360 | A1* | 7/2003 | Badr et al. ..................... 280/789 |
| 2003/0146835 | A1* | 8/2003 | Carter ....................... 340/539.13 |
| 2003/0158632 | A1 | 8/2003 | Nierlich et al. |
| 2004/0025496 | A1* | 2/2004 | Patterson, Jr. .................... 60/254 |
| 2007/0050085 | A1* | 3/2007 | Hashimoto et al. ............ 700/245 |
| 2007/0100503 | A1* | 5/2007 | Balan et al. .................... 700/286 |
| 2007/0100504 | A1* | 5/2007 | Moxley ...................... 700/286 |
| 2008/0217998 | A1* | 9/2008 | Parmley ........................... 307/65 |
| 2008/0281540 | A1* | 11/2008 | Zweigle et al. .................. 702/66 |
| 2009/0021082 | A1* | 1/2009 | Loucks et al. ................... 307/87 |
| 2010/0127572 | A1* | 5/2010 | Uselton et al. .................. 307/80 |
| 2010/0320838 | A1* | 12/2010 | Massie et al. .................... 307/39 |
| 2010/0327800 | A1* | 12/2010 | Reineccius ................... 320/101 |
| 2011/0001664 | A1* | 1/2011 | Olpp ........................ 342/357.24 |
| 2011/0066262 | A1* | 3/2011 | Kelly et al. ...................... 700/90 |
| 2011/0082654 | A1* | 4/2011 | Dickens .......................... 702/60 |
| 2011/0115302 | A1* | 5/2011 | Slota et al. ...................... 307/87 |
| 2011/0148214 | A1* | 6/2011 | Dahlen ........................... 307/87 |
| 2011/0166716 | A9* | 7/2011 | Rovnyak et al. ............... 700/287 |
| 2011/0208364 | A1* | 8/2011 | DeLoach, Jr. ................. 700/286 |
| 2011/0276194 | A1* | 11/2011 | Emalfarb et al. ............. 700/297 |

(Continued)

OTHER PUBLICATIONS

Barsali et al, "Control techniques of Dispersed Generators to improve the continuity of electricity supply" 2002, IEEE, pp. 789-794.*

(Continued)

*Primary Examiner* — Carlos Ortiz Rodriguez
*Assistant Examiner* — Olvin Lopez Alvarez
(74) *Attorney, Agent, or Firm* — Burns & Levinson LLP; Joseph M. Maraia

(57) ABSTRACT

The electrical phase synchronization technology includes a system, a method, and/or components thereof. In some examples, the electrical phase synchronization system includes an electrical power transmission network having a plurality of transmission lines and a plurality of electrical power generation devices. Each electrical power generation device includes an electrical power source and a control unit.

15 Claims, 6 Drawing Sheets

(56) References Cited

U.S. PATENT DOCUMENTS

| | | |
|---|---|---|
| 2011/0302078 A1* | 12/2011 | Failing .......................... 705/39 |
| 2012/0019000 A1* | 1/2012 | Folken et al. .................... 290/7 |
| 2012/0049638 A1* | 3/2012 | Dorn et al. ...................... 307/87 |

OTHER PUBLICATIONS

Chen et al, "A new Approach to Real Time Measurement of Power Angles of Generators at Different Locations for Stability Control" 2000, IEEE, pp. 1237-1242.*

Wikipedia, "Synchronization", pp. 1, May 6, 2014.*

IEEE, "1547 IEEE Standard for Interconnecting Distributed Resources with Electric Power System", Jul. 28, 2003, pp. 27.*

Martinez et al, "Using Synchronized Phasor Angle Difference for Wide-Area Protection and Control", 2006, pp. 1-11.*

Schweitzer et al, "Real-World Synchrophasor Solutions", Apr. 2, 2009, pp. 536-547.*

Abb, "Improved Power System Performance through Wide Area Monitoring, Protection and Control", 2004, pp. 24.*

Mills-price et al, "Solar Generation Control With Time Synchronized Phasors" Apr. 14, 2014, pp. 160-167.*

Ohno et al, "Islanding Protection System Based on Synchronized Phasor Measurements and its Operational Experiences", 2008, pp. 1-5.*

Cho et al, "Active Synchronizing Control of a Microgrid", Dec. 2011, pp. 3707-3719.*

Fardanesh, "Distribution System Protection with Decentralized Generation Introduced into the System", Feb. 1984, pp. 122-130.*

Vasquez et al, "Hierarchical control of intelligent microgrids", Dec. 2010, pp. 23-29.*

* cited by examiner

ELECTRICAL PHASE SYNCHRONIZATION

BACKGROUND

Three phase transmission is generally the most efficient method for distributing alternating current from electrical power sources to electrical loads (also referred to as electrical sinks). Electrical power transmission is typically accomplished via an electrical power grid (the "grid"). In three phase transmission, each phase is transmitted onto the grid at a precise time. Without the phase synchronization, reliability of the electrical power transmission network or grid cannot be maintained because the power supplied from each of the electrical power sources causes spikes and dips in the current on the network. To this end, electrical power sources typically operate in the standby mode to synchronize their electrical phases to the electrical power transmission network. The electrical power from an individual electrical power source is generally connected to the network based on an operator command to ensure that the electrical power on the network is in phase. Before the connection, the electrical power produced while adjusting frequency, phase, and voltage and during stabilization, is typically lost.

Electrical power sources are becoming more numerous due to the increase in renewable power sources (e.g., solar, thermal, etc.) and/or smaller power sources (e.g., natural gas generator, diesel generator, etc.). These energy sources must be synchronized and safely/efficiently applied to the network. Thus, there is a need in the art for an improved system, apparatus, and method for electrical phase synchronization.

SUMMARY

One approach is a system that provides electrical phase synchronization. The system includes an electrical power transmission network having a plurality of transmission lines and a plurality of electrical power generation devices. Each electrical power generation device includes an electrical power source configured to supply electrical power to the electrical power transmission network via one or more of the plurality of transmission lines and a control unit configured to phase synchronize the electrical power supply from the electrical power source with an input location on the electrical power transmission network based on a geographic location of the electrical power generation device, a geographic location of the input location on the electrical power transmission network, time synchronization data, and electrical phase configuration data for the input location.

Another approach is a method for providing electrical phase synchronization. The method includes determining a transmission line distance for an electrical power supply between a geographic location of the electrical power supply and a geographic location of an input location on a electrical power transmission network; determining an electrical phase for the electrical power supply based on the transmission line distance, time synchronization data, and electrical phase configuration data for the input location; and phase synchronizing the electrical power supply based on the electrical phase for transmission to the input location on the electrical power transmission network.

Another approach is a control unit that provides electrical phase synchronization. The control unit includes a geographic determination module configured to determine a transmission line distance for an electrical power supply between a geographic location of an electrical power source and a geographic location of an input location on an electrical power transmission network; an electrical power determination module configured to determine an electrical phase for the electrical power supply based on the transmission line distance, time synchronization data, and electrical phase configuration data for the input location; and an electrical power supply synchronization device configured to phase synchronize the electrical power supply based on the electrical phase and transmit the phase synchronized electrical power supply to the electrical power transmission network.

Any of the approaches described herein can include one or more of the following examples.

In some examples, each electrical power generation device is configured to independently and autonomously supply phase synchronized electrical power to the electrical power transmission network. In other examples, the electrical power supplied to the electrical power transmission network by each electrical power generation device is phase synchronized within an electrical phase tolerance range.

In some examples, each control unit is further configured to determine at least one of frequency, voltage, current, phase, and duration for the electrical power supply from the electrical power source based on the geographic location of the electrical power generation device. In other examples, each control unit is further configured to phase synchronize at least one of the determined frequency, voltage, current, phase, and duration of the electrical power supply from the electrical power source with the input location on the electrical power transmission network.

In some examples, each control unit is further configured to determine an electrical phase for the supply of electrical power from the electrical power source based on a geographic distance between the geographic location of the electrical power generation device and the geographic synchronization location on the electrical power transmission network. In other examples, each electrical power generation device further includes a communication module configured to receive the geographic location of the electrical power generation device and the time synchronization data from a timing device.

In some examples, each electrical power generation device further includes an alert module configured to generate an alert based on at least one of a change in the geographic location of the electric power generation device, maintenance information, and supply information.

In other examples, the method includes determining at least one of frequency, voltage, current, phase, and duration for the electrical power supply based on the geographic location of the electrical power supply. In some examples, the method includes phase synchronizing the electrical power supply based on at least one of the determined frequency, voltage, current, phase, and duration.

In other examples, the electrical phase configuration data for the input location is pre-defined. In some examples, the method includes dynamically receiving the electrical phase configuration data for the input location.

In other examples, the method includes determining the geographic location of the electrical power supply based on data received from a global positioning system. In some examples, the method includes receiving the time synchronization data from a timing device.

In other examples, the control unit includes a geographic positioning module configured to determine the geographic location of the electrical power supply. In some examples, the electrical power determination module is further configured to determine at least one of frequency, voltage, current, and duration for the electrical power supply based on the geographic location of the electrical power supply.

In other examples, the electrical power supply synchronization device is further configured to phase synchronize the electrical power supply based on at least one of the determined frequency, voltage, current, and duration.

The electrical phase synchronization technology described herein can provide one or more of the following advantages. An advantage to the technology is that a plurality of power generation devices can be connected to an electrical power transmission network without requiring a centralized electrical phase synchronization device (e.g., master power generation device, centralized power generation controller, etc.), thereby decreasing the electrical energy wasted during the phase synchronization phase. Another advantage to the technology is that a plurality of power generation devices can be connected and disconnected to an electrical power transmission network without regard to the identity or knowledge of any centralized electrical phase synchronization device, thereby enabling a power generation device to quickly and efficiently connect to the electrical power transmission network.

Another advantage to the technology is that the plurality of power generation devices can be located and/or moved throughout the electrical power generation network and phase synchronized based on geographic location, thereby increasing the effective useful applications and mobility of the power generation devices. Another advantage to the technology is that the plurality of power generation devices are electrically phase synchronized based on geographic locations and a timing source, thereby decreasing the reliance on a single point of failure and reducing the potential for failure in the electrical power transmission network.

BRIEF DESCRIPTION OF THE DRAWINGS

The foregoing and other objects, features and advantages will be apparent from the following more particular description of the embodiments, as illustrated in the accompanying drawings in which like reference characters refer to the same parts throughout the different views. The drawings are not necessarily to scale, emphasis instead being placed upon illustrating the principles of the embodiments.

DETAILED DESCRIPTION

The electrical phase synchronization technology described herein enables phase synchronization of electrical power generation sources (e.g., fossil fuel power plant, renewable energy power capture plant, etc.) by utilizing geographic location information (e.g., global positioning system information, radio triangulation information, etc.), time information (e.g., network time information, atomic time information, etc.), and phase synchronization information (e.g., pre-defined phase information, dynamically received phase information, etc.). Each electrical power generation source can independently and autonomously supply phase synchronized electrical power to an electrical power transmission network (also referred to as the electrical grid) based on the geographic location information, the time information, and the phase synchronization information. The electrical power supplied from each of the electrical power generation sources is phase synchronized to ensure that the delivery of power onto the electrical power transmission network is uniform.

The technology enables the integration of the proper phase, frequency, and voltage power to the electrical power transmission network (e.g., within an electrical phase tolerance range), thereby advantageously increasing the efficiency of the network and meeting the safety interlocks of the network (e.g., the electrical phase of the incoming electrical power matches the electrical phase of the electrical power on the network, etc.). The technology can utilize a timing device (e.g., an accurate clock, a navigation satellite, etc.) to phase synchronize the electrical power supply to a regional grid, a country grid, a continental grid, an ad hoc grid, an intentional island grid, and/or non-intentional island grid. For each of these grids, the technology standardizes the electrical phase to ensure that the electrical power transmission network is synchronized and does not destroy or damage any of the electrical generating and/or consuming devices connected to the network.

Figure 1:
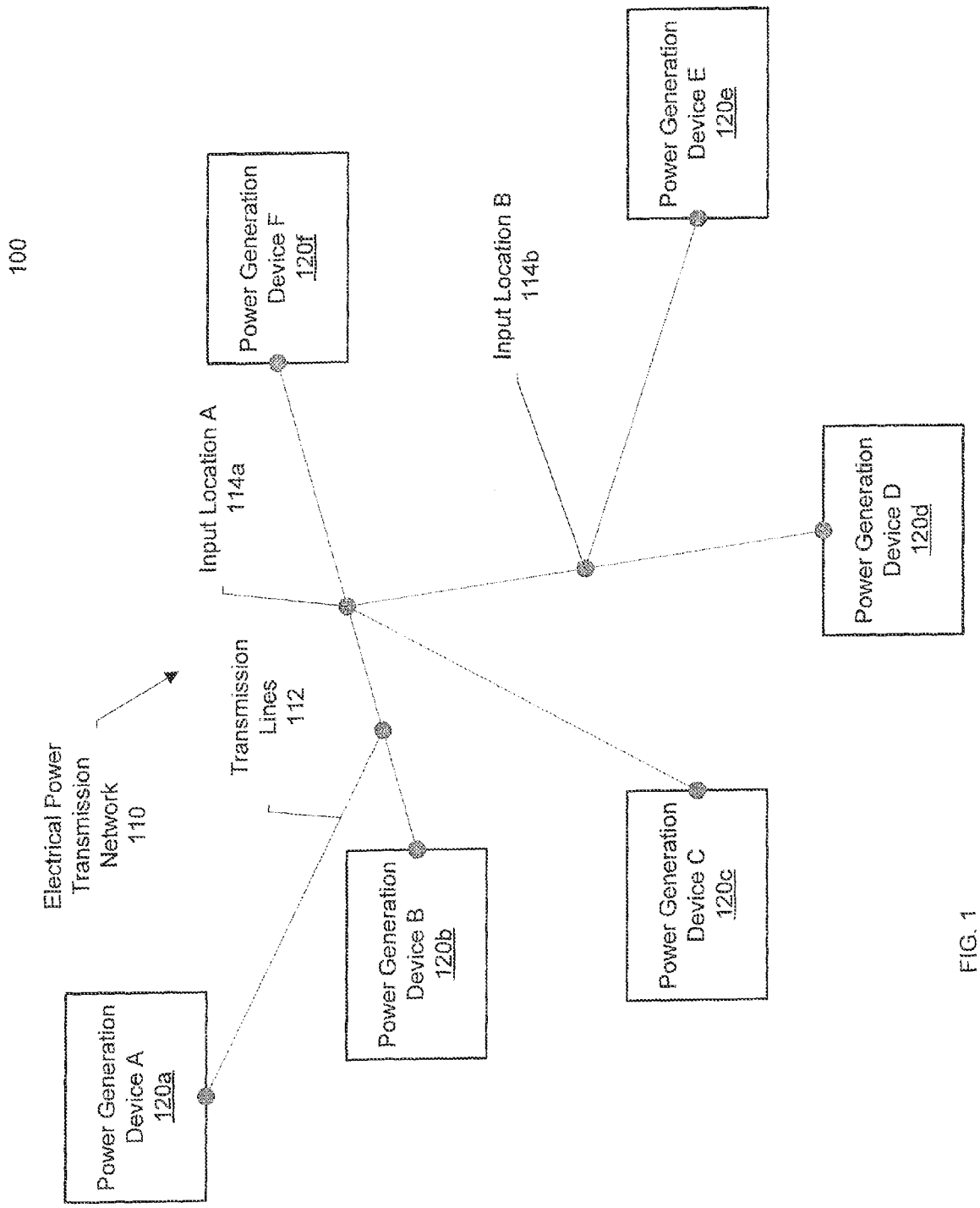
FIG. 1 is a diagram of an exemplary electrical power transmission environment.

FIG. 1 is a diagram of an exemplary electrical power transmission environment 100. The environment 100 includes an electrical power transmission network 110 and a plurality of power generation devices A (120*a*), B (120*b*), C (120*c*), D (120*d*), E (120*e*), and F (120*f*) (generally referred to as power generation devices 120). Each of the power generation devices 120 supply electrical power (e.g., two phase alternating current, three phase alternating current, etc.) to the electrical power transmission network 110 via a plurality of transmission lines 112. As illustrated in FIG. 1, the environment 100 includes a plurality of input locations A (114*a*) and B (114*b*). The input locations A 114*a* and B 114*b* are utilized as geographic locations for the supply of electrical power onto the electrical power transmission network 110 (e.g., pre-defined geographic location, dynamically defined geographic location, etc.). The electrical power supplied to the electrical power transmission network 110 is used by electrical power sinks (not shown) (e.g., electrical devices in a residential subdivision, electrical devices in a factory, electrical devices in an office building, etc).

Although FIG. 1 illustrates the power generation devices 120, the environment 100 can include any number of power generation devices forty, one hundred, two hundred, etc.). Although FIG. 1 illustrates two input locations A 114*a* and B 114*b*, the environment 100 can include any number of input locations (e.g., ten, twenty, one hundred, etc.).

Figure 2:
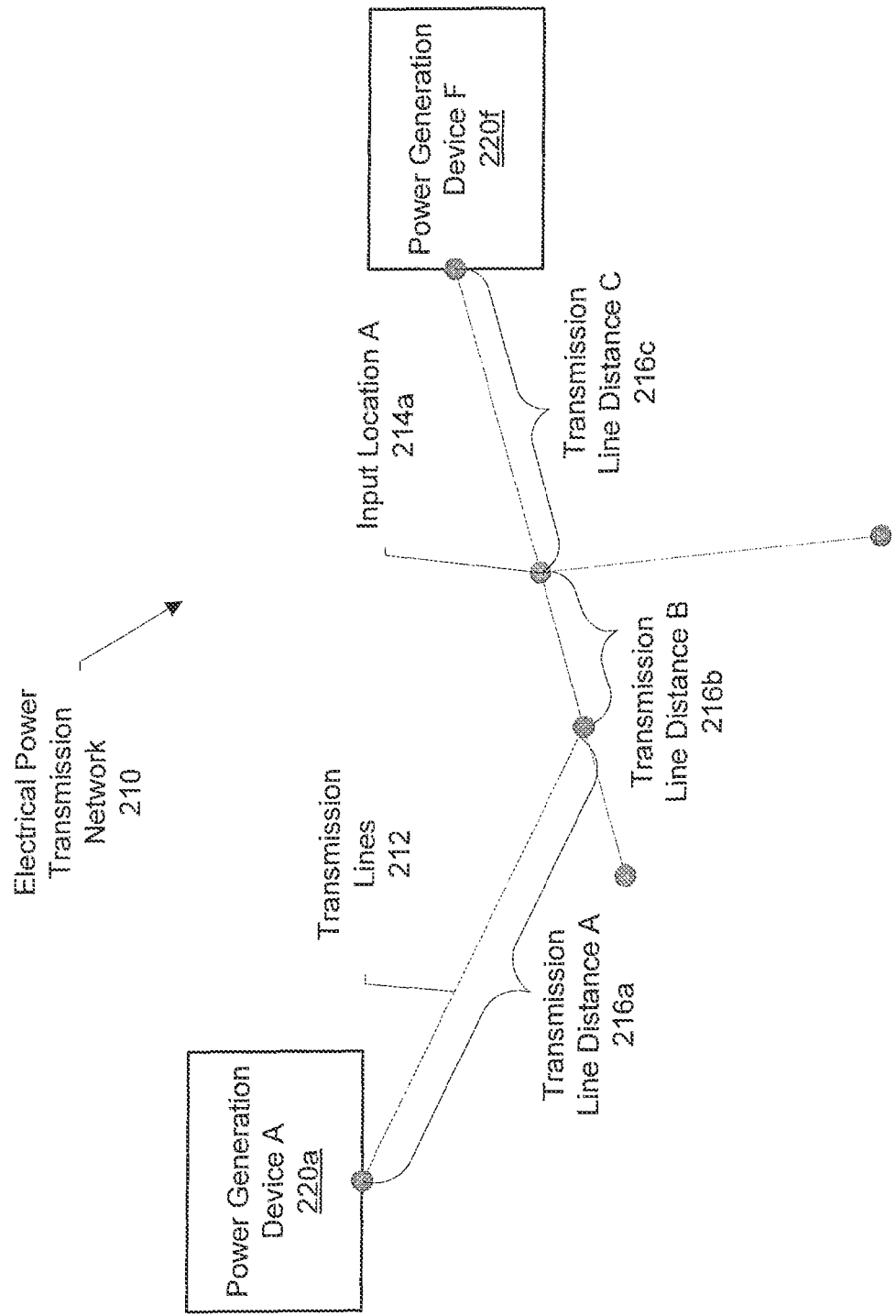
FIG. 2 is a diagram of another exemplary electrical power transmission environment.

FIG. 2 is a diagram of another exemplary electrical power transmission environment 200. The environment 200 includes an electrical power transmission network 210 and power generation devices A (220*a*) and F (220*f*). The power generation devices A 220*a* and F 220*f* supply electrical power to the electrical power transmission network 210 via a plurality of transmission lines 212. Each transmission line 212 has a defined distance: transmission line distances A 216*a*, B 216*b*, and C 216*c*. For example, the distance of each transmission line 212 is defined at the time of installation of the transmission line 212 and/or defined after installation of the transmission line 212. As illustrated in FIG. 2, the environment 100 includes an input location A 214*a*. The input location A 214*a* is utilized as geographic locations for the supply of electrical power onto the electrical power transmission network 210. The electrical power supplied to the electrical power transmission network 210 is used by electrical power sinks (not shown).

As an exemplary mode of operation, each power generation device A 220a or F 220f determines a transmission line distance between the power generation device A 220a or F 220f and the input location A 214a. The power generation device A 220a determines a transmission line distance between the power generation device A 220a and the input location A 214a (e.g., physical distance that the electrical power travels via the transmission lines 212 in the electrical power transmission network 210, etc.). In this example, the transmission line distance is the transmission line distance A 216a plus the transmission line distance B 216b. The power generation device A 220a determines an electrical phase for the supply of electrical power (e.g., transmit at 0 degrees, transmit at 120 degrees, etc.) based on the transmission line distance, time synchronization data (e.g., network time clock, atomic clock, etc.), and electrical phase configuration data for the input location (e.g., pre-defined data, dynamically received data, etc.).

For example, the power generation device A 220a divides the transmission line distance by the speed of the electricity (0.7 to 0.85 of the speed of light $3*10^8$ meters/second; the reduction is due to the resistance in the transmission lines 212) and then determines a time to transmit the electrical power onto the network 210 based on the current time and the electrical phase at the input location A 214a. As another example, the power generation device A 220a determines n=(transmission distance from the power generation device A 220a to the input location A 214a)/(0.7*$3*10^8$ meters/second), where n represents a time to transmit the electrical power onto the network 210. In other examples, the speed of the electricity varies based on the electrical property of the conductor and/or the shielding material of the transmission lines 212. The power generation device A 220a phase synchronizes the electrical power supply based on the electrical phase for transmission to the input location A 214a on the electrical power transmission network 210. Table 1 illustrates exemplary transmission line distances, time synchronization data, and electrical phase configuration data. Table 2 illustrates exemplary phase synchronization of the electrical power supply.

TABLE 1

Exemplary Data

| Power Generation Device | Transmission Line Distance | Time Synchronous Data | Electrical Phase Configuration Data |
|---|---|---|---|
| A 120a | 30.3 kilometers | 04:32.22 | Input Location A 114a - 0 degrees every hour |
| B 120b | 20.1 kilometers | 04:35.22 | Input Location A 114a - 120 degrees at every half hour |
| F 120f | 10.2 kilometers | 04:38.22 | Input Location B 114b - 240 degrees every hour |

TABLE 2

Exemplary Phase Synchronization

| Power Generation Device | Time for Transmission | Phase at Transmission | Phase at Input Location |
|---|---|---|---|
| C 120c | 05:32.23 | 0 degrees | 0 degrees at the hour |
| D 120d | 06:11.53 | 0 degrees | 120 degrees at the half hour |
| E 120e | 09:45.22 | 0 degrees | 240 degrees at the hour |

Figure 3:
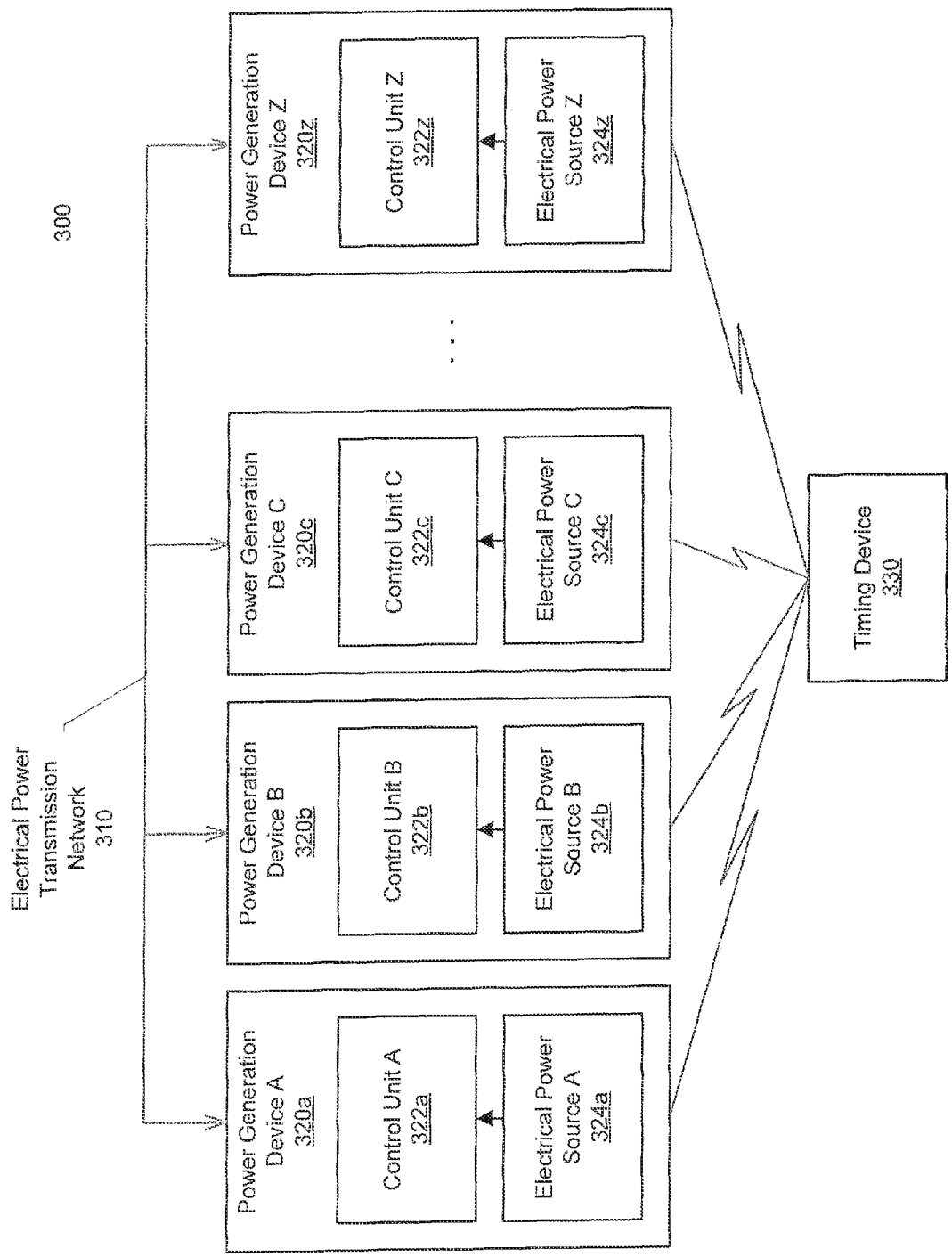
FIG. 3 is a diagram of another exemplary electrical power transmission environment.

FIG. 3 is a diagram of another exemplary electrical power transmission environment 300. The environment 300 includes an electrical power transmission network 310, a plurality of electrical power generation devices A 320a, B 320b, C 320c through Z 320z, and a timing device 330. The electrical power transmission network 310 includes a plurality of transmission lines (not shown). Each of the electrical power generation devices A 320a, B 320b, C 320c through Z 320z includes a control unit A 322a, B 322b, C 322c through Z 322z (generally referred to as a control unit 322), respectively, and an electrical power source A 324a, B 324b, C 324c through Z 324z, respectively. The timing device 330 transmits time synchronization data (e.g., clock signal, relative time signal, etc.).

Each of the electrical power sources A 324a, B 324b, C 324c through Z 324z (generally referred to as the electrical power source 324) supplies electrical power to the electrical power transmission network 310 via one or more of the plurality of transmission lines. Each of the control units A 322a, B 322b, C 322c through Z 322z phase synchronizes the electrical power supply from the electrical power source, A 324a, B 324b, C 324c through Z 324z, respectively, with an input location (not shown) on the electrical power transmission network based on a geographic location of the electrical power generation device, A 320a, B 320b, C 320c through Z 320z, respectively, a geographic location of the input location on the electrical power transmission network 310, the time synchronization data, and electrical phase configuration data for the input location.

In other examples, the control unit 322 phase synchronizes the electrical power within an electrical phase tolerance range (e.g., within 2 degrees, within 10 degrees, etc.). In some examples, the electrical power source 324 includes an inverter and/or a converter for the conversion of alternating current (AC) from direct current (DC) and vice versa. In other examples, the electrical power source 324 includes a power generation device, a power storage device (e.g., battery, electro-mechanical storage device, etc.) and/or any other type of electrical power source. For example, the electrical power source 324 includes a direct current (DC) power generator, a direct current energy storage device, and a direct current to alternating current (AC) inverter. The DC power generator supplies DC electrical power to the DC energy storage device. The DC energy storage device stores the DC electrical power. Upon demand, the DC energy storage device supplies the DC electrical power to the AC inverter which inverts the DC electrical power to AC electrical power and supplies the AC electrical power to the control unit 322.

Figure 4:
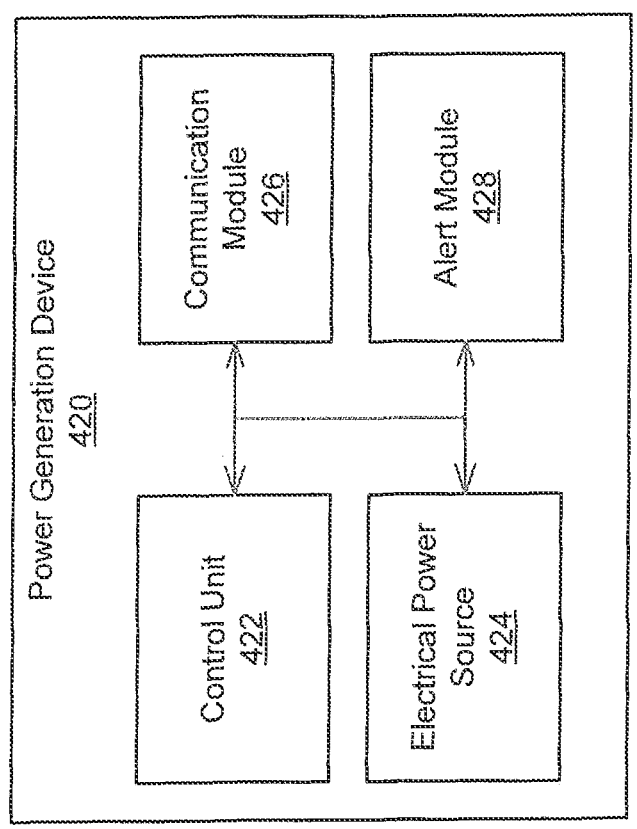
FIG. 4 is a block diagram of an exemplary power generation device.

FIG. 4 is a block diagram of an exemplary power generation device 420. The power generation device 420 includes a control unit 422, an electrical power source 424, a communication module 426, and an alert module 428. The control unit 422 phase synchronizes the electrical power supply from the electrical power source with an input location on the electrical power transmission network based on a geographic location of the electrical power generation device, a geographic location of the input location on the electrical power transmission network, time synchronization data, and electrical phase configuration data for the input location. The electrical power source 424 supplies electrical power to the electrical power transmission network (not shown) via one or more of the plurality of transmission lines.

The communication module 426 receives the geographic location of the electrical power generation device (e.g., from a global positioning system satellite, from a network location device, from a satellite positioning system, etc.). The communication module 426 receives the time synchronization data from a timing device (e.g., a global positioning system, an atomic clock, a radio clock, a computer network clock, etc.).

The alert module 428 generates an alert based on at least one of a change in the geographic location of the electric power generation device (e.g., movement more than one hundred yards, movement more than one mile, etc.), maintenance information (e.g., air filter change, oil change, etc.), and supply information frequency below sixty hertz, current below two amps, etc.). The communication module 426 can, for example, communicate the alert to an external communication system telephone network, local area network, etc.) and/or notify an administrator (e.g., transmit email to system operating administrator, transmit a pager notification to security administrator, etc.).

Figure 5:
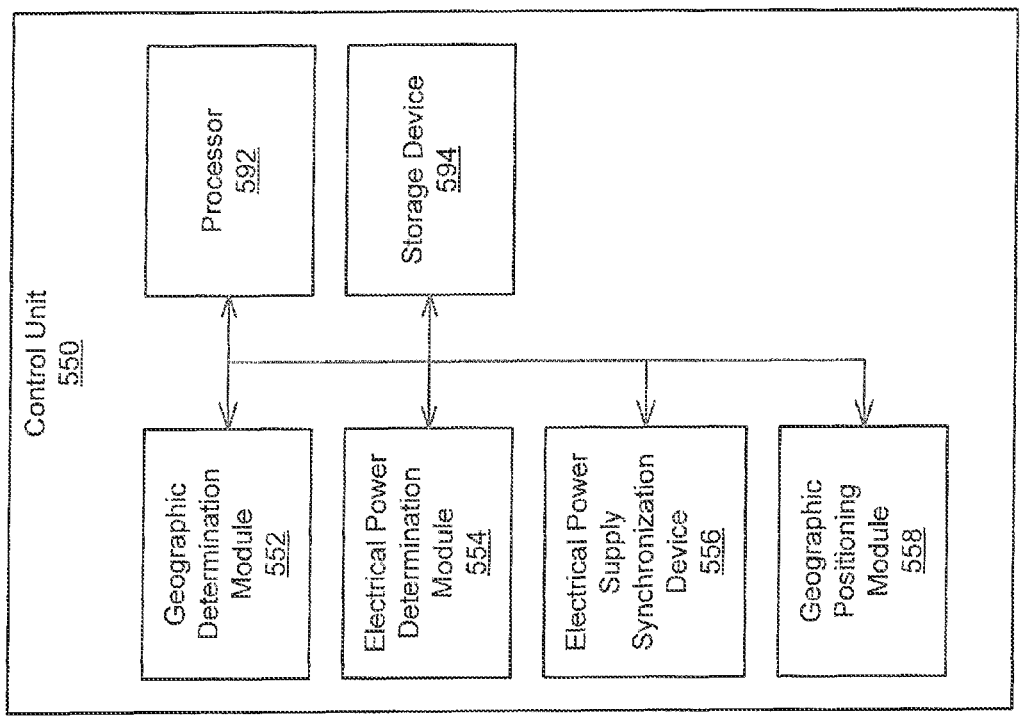
FIG. 5 is a block diagram of an exemplary control unit.

FIG. 5 is a block diagram of an exemplary control unit 550. The control unit 550 includes a geographic determination module 552, an electrical power determination module 554, an electrical power supply synchronization device 556, a geographic positioning module 558, a processor 592, and a storage device 594. The modules and devices described herein can, for example, utilize the processor 592 to execute computer executable instructions and/or include a processor to execute computer executable instructions (e.g., an encryption processing unit, a field programmable gate array processing unit, etc.). It should be understood that the control unit 550 can include, for example, other modules, devices, and/or processors known in the art and/or varieties of the illustrated modules, devices, and/or processors.

The geographic determination module 552 determines a transmission line distance for the electrical power supply (e.g., directly connected to the control unit 550, indirectly connected to the control unit 550, etc.) between a geographic location of the electrical power source (e.g., directly connected to the control unit 550, indirectly connected to the control unit 550, etc.) and a geographic location of an input location on an electrical power transmission network. The electrical power determination module 554 determines an electrical phase for the electrical power supply based on the transmission line distance, time synchronization data, and electrical phase configuration data for the input location. The electrical power supply synchronization device 556 phase synchronizes the electrical power supply based on the electrical phase and transmits the phase synchronized electrical power supply to the electrical power transmission network (e.g., modifies the electrical power output, modifies the electrical power generation parameters, etc.). The geographic positioning module 558 determines the geographic location of the electrical power supply (e.g., triangulates based on global positioning system information, triangulates based on radio transmissions, input by a user, etc.).

The processor 592 executes an operating system and/or any other computer executable instructions for the control unit 550 (e.g., executes applications, etc.). The storage device 594 stores the geographic location of the electrical power generation device, the geographic location of the input location on the electrical power transmission network, the time synchronization data, the electrical phase configuration data for the input location, and/or any other information associated with the control unit 550. The storage device 594 can include a plurality of storage devices and/or the control unit 550 can include a plurality of storage devices. The storage device 594 can include, for example, long-term storage (e.g., a hard drive, a tape storage device, flash memory, etc.), short-term storage (e.g., a random access memory, a graphic memory, etc.), and/or any other type of computer readable storage.

In some examples, the electrical power determination module 554 determines at least one of frequency, voltage, current, and duration for the electrical power supply based on the geographic location of the electrical power supply. For example, the electrical power determination module 554 determines that the electrical power outlet should be 50 hertz at 220 volts based on the location of the electrical power supply in zone B (e.g., from pre-defined electrical power information, dynamically received electrical power information, etc.). Table 3 illustrates exemplary information based on the geographic location.

TABLE 3

Exemplary Information Based on Geographic Location

| Geographic Location | Voltage | Frequency | Current |
|---|---|---|---|
| Area B | 110 volts | 60 hertz | 1,000 amps |
| Area D3 | 220 volts | 400 hertz | 200 amps |
| Area Z | 10,000 volts | 50 hertz | 5 amps |

In other examples, the electrical power supply synchronization device 556 phase synchronizes the electrical power supply based on at least one of the determined frequency, voltage, current, and duration. For example, the electrical power supply synchronization device 556 transforms the electrical power supply from 110 volts to 220 volts. As another example, the electrical power supply synchronization device 556 transforms the frequency from 60 hertz to 50 hertz. In these examples, the electrical power supply synchronization device 556 phase synchronizes the electrical power supply based on the information determined by the electrical power determination module 554.

Figure 6:
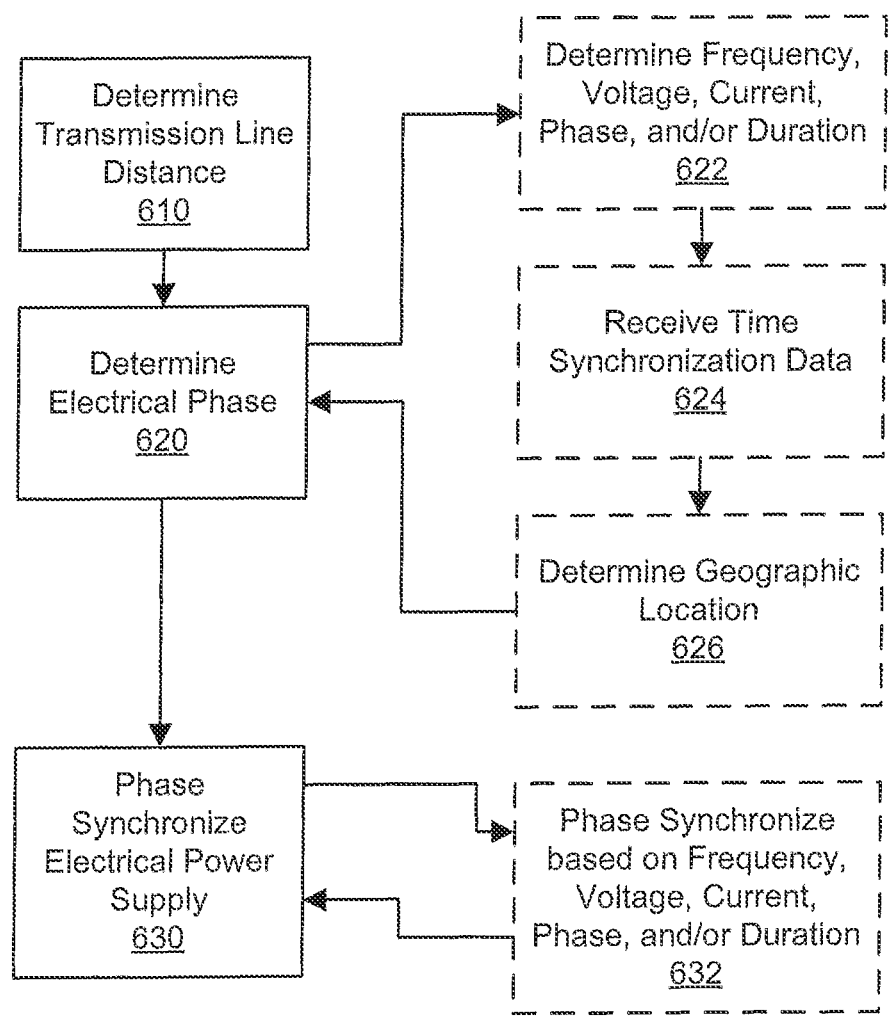
FIG. 6 is a flowchart of an exemplary electrical phase synchronization process.

FIG. 6 is a flowchart of an exemplary electrical phase synchronization process 600 utilizing, for example, the control unit 550 of FIG. 5. The geographic determination module 552 determines (610) a transmission line distance for an electrical power supply between a geographic location of the electrical power supply and a geographic location of an input location on an electrical power transmission network. The electrical power determination module 554 determines (620) an electrical phase for the electrical power supply based on the transmission line distance, time synchronization data, and electrical phase configuration data for the input location. The electrical power supply synchronization device 556 phase synchronizes (630) the electrical power supply based on the electrical phase for transmission to the input location on the electrical power transmission network.

In some examples, the electrical power determination module 554 determines (622) at least one of frequency, voltage, current, phase, and duration for the electrical power supply based on the geographic location of the electrical power supply. The electrical power supply synchronization device 556 phase synchronizes (624) the electrical power supply based on at least one of the determined frequency, voltage, current, phase, and duration. The geographic positioning module 558 determines (626) the geographic location of the electrical power supply based on data received from a global positioning system.

In other examples, control unit 550 phase synchronizes (632) at least one of the determined frequency, voltage, current, phase, and duration of the electrical power supply from the electrical power source with the input location on the electrical power transmission network. In some examples, the electrical phase configuration data for the input location is pre-defined and/or stored in the storage device 594. In other examples, the control unit 550 dynamically receives the electrical phase configuration data for the input location. In some examples, the control unit 550 receives the time synchronization data from a timing device.

Comprise, include, and/or plural forms of each are open ended and include the listed parts and can include additional parts that are not listed. And/or is open ended and includes one or more of the listed parts and combinations of the listed parts.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

What is claimed is:

1. An electrical phase synchronization system, the system comprising:
   at least one or more mobile electrical power generation devices each comprise a mobile electrical power source, a communication module, and an associated control unit, wherein at least one mobile electrical power generation device comprises:
   at least one mobile electrical power source configured to supply electrical power to a known input location having a pre-defined electrical phase configuration in an electrical power transmission network via at least one transmission line of the electrical power transmission network;
   at least one associated control unit configured to phase synchronize the electrical power from the at least one mobile electrical power source to be input to the electrical power transmission network with electrical power at the input location independently and autonomously from any other phase synchronizing device or controller based on receiving at a communication module satellite positioning geographic location information for the at least one mobile electrical power source and time synchronization data from a timing device, and based on calculating a time for transmission and a phase at transmission for the at least one mobile device based only on a transmission line distance between the geographic location of the at least one mobile electrical power source and the known input location on the electrical power transmission network, the received time synchronization data, and the pre-defined electrical phase configuration data for the known input location; and
   wherein the at least one associated control unit is communicatively isolated from any electrical phase synchronization device of the electrical power transmission network, and the at least one associated control unit is further configured to phase synchronize the electrical power from the at least one mobile electrical power source again when a change in a geographic position of the at least one electric power generation device occurs.

2. The system of claim 1, wherein the electrical power supplied to the electrical power transmission network by the at least one mobile electrical power generation device is phase synchronized within an electrical phase tolerance range.

3. The system of claim 1, wherein the at least one associated control unit is further configured to determine at least one of frequency, voltage, current, phase, and duration for the electrical power supply from the at least one mobile electrical power source based on the geographic location of the at least one mobile electrical power generation device.

4. The system of claim 3, wherein the at least one associated control unit is further configured to phase synchronize at least one of the determined frequency, voltage, current, phase, and duration of the electrical power supply from the at least one mobile electrical power source with the input location on the electrical power transmission network.

5. The system of claim 1, wherein the at least one mobile electrical power generation device further comprises an alert module configured to generate an alert based on the change in the geographic location of the at least one electric power generation device.

6. A method for electrical phase synchronization, the method comprising:
   determining by a mobile electrical power generation device a transmission line distance between a geographic location of a mobile electrical power source and a geographic location of a known input location having a pre-defined electrical phase configuration on an electrical power transmission network;
   calculating independently and autonomously from any other phase synchronizing device or controller a time for transmission and a phase at transmission for electrical power generated by the mobile electrical power source to be transmitted to the known input location on the electrical power transmission network based only on the transmission line distance, a time synchronization data, and a pre-defined electrical phase configuration data for the known input location;
   and phase synchronizing the electrical power from the mobile electrical power source to be input to the electrical power transmission network based on the time for transmission and phase at transmission to the known input location on the electrical power transmission network,
   wherein the mobile electrical power generation device is communicatively isolated from any electrical phase synchronization device of the electrical power transmission network, and at least one associated control unit is configured to phase synchronize the electrical power from the mobile electrical power source again when a change in a geographic position of the electric power generation device occurs.

7. The method of claim 6, further comprising determining at least one of frequency, voltage, current, phase, and duration for the mobile electrical power source based on the geographic location of the mobile electrical power source.

8. The method of claim 7, further comprising phase synchronizing the mobile electrical power source based on at least one of the determined frequency, voltage, current, phase, and duration.

9. The method of claim 6, further comprising dynamically receiving the pre-defined electrical phase configuration data for the known input location.

10. The method of claim 6, further comprising determining the geographic location of the mobile electrical power source based on data received from a global positioning system.

11. The method of claim 6, further comprising receiving the time synchronization data from a timing device.

12. A control unit for electrical phase synchronization, the control unit comprising:

a geographic determination module configured to determine a transmission line distance between a geographic location of a mobile electrical power source of a mobile electrical power generation device and a geographic location of a known input location having a pre-defined electrical phase configuration on an electrical power transmission network;

an electrical power determination module configured to calculate a time for transmission and a phase at transmission for the mobile electrical power source based only on the transmission line distance, time synchronization data, and the pre-defined electrical phase configuration data for the known input location;

and a mobile electrical power supply synchronization device configured to phase synchronize the mobile electrical power source by transmitting the electrical power supply to the electrical power transmission network in accordance with the determined time for transmission and phase at transmission, wherein the mobile electrical power generation device is communicatively isolated from any electrical phase synchronization device of the electrical power transmission network, and the electrical power determination module is further configured to phase synchronize the electrical power from the at least one mobile electrical power source again when a change in a geographic position of the at least one electric power generation device occurs.

13. The control unit of claim 12, further comprising a geographic positioning module configured to determine the geographic location of the mobile electrical power sources.

14. The control unit of claim 12, wherein the electrical power determination module is further configured to determine at least one of frequency, voltage, current, and duration for the mobile electrical power source based on the geographic location of the mobile electrical power source.

15. The control unit of claim 14, wherein the mobile electrical power supply synchronization device is further configured to phase synchronize the mobile electrical power sources based on at least one of the determined frequency, voltage, current, and duration.

* * * * *